(12) United States Patent
Michelet et al.

(10) Patent No.: US 9,144,849 B2
(45) Date of Patent: Sep. 29, 2015

(54) CUTTING TOOL HOLDING A PLURALITY OF TYPES OF CUTTING INSERTS

(75) Inventors: Benjamin Michelet, Bourges (FR); Bertrand Riviere, Bourges (FR)

(73) Assignee: Seco Tools AB, Fagersta (SE)

( * ) Notice: Subject to any disclaimer, the term of this patent is extended or adjusted under 35 U.S.C. 154(b) by 355 days.

(21) Appl. No.: 13/883,084

(22) PCT Filed: Oct. 27, 2011

(86) PCT No.: PCT/EP2011/068854
§ 371 (c)(1),
(2), (4) Date: May 2, 2013

(87) PCT Pub. No.: WO2012/059394
PCT Pub. Date: May 10, 2012

(65) Prior Publication Data
US 2013/0216319 A1    Aug. 22, 2013

(30) Foreign Application Priority Data

Nov. 3, 2010 (EP) .................................... 10189748
Nov. 3, 2010 (EP) .................................... 10189749

(51) Int. Cl.
| | |
|---|---|
| *B23C 5/06* | (2006.01) |
| *B23C 5/20* | (2006.01) |
| *B23C 5/08* | (2006.01) |
| *B23C 5/22* | (2006.01) |
| *F02C 9/00* | (2006.01) |

(52) U.S. Cl.
CPC . *B23C 5/205* (2013.01); *B23C 5/08* (2013.01); *B23C 5/207* (2013.01); *B23C 5/22* (2013.01); *B23C 5/2208* (2013.01); *B23C 5/2221* (2013.01); *F02C 9/00* (2013.01); *B23C 2200/367* (2013.01); *B23C 2210/0442* (2013.01); *B23C 2210/168* (2013.01); *Y10T 407/1906* (2015.01); *Y10T 407/1936* (2015.01); *Y10T 407/2266* (2015.01); *Y10T 407/235* (2015.01); *Y10T 407/245* (2015.01)

(58) Field of Classification Search
CPC .............. B23C 5/06; B23C 5/08; B23C 5/20; B23C 5/2247; B23C 2210/168; B23C 2210/163; Y10T 407/1924
USPC .......................................................... 407/42
See application file for complete search history.

(56) References Cited

U.S. PATENT DOCUMENTS

| | | |
|---|---|---|
| 1,838,520 A | 12/1931 | Archer |
| 5,145,294 A | 9/1992 | Flueckiger |
| 6,152,658 A | 11/2000 | Satran |
| 6,164,878 A * | 12/2000 | Satran et al. .................. 407/113 |
| 6,234,724 B1 | 5/2001 | Satran |

(Continued)

FOREIGN PATENT DOCUMENTS

DE    10308037 A1    9/2004

*Primary Examiner* — Daniel Howell
*Assistant Examiner* — Alan Snyder
(74) *Attorney, Agent, or Firm* — Corinne R. Gorski (57) ABSTRACT

A toolholder for holding a plurality of types of removable cutting inserts is provided. The toolholder includes a toolholder body having an insert-receiving recess. The recess includes an insert abutment surface for abutting a corresponding insert supporting surface of an insert. The insert abutment surface includes a first portion that abuts a first insert supporting surface of a first type of cutting insert and a second portion abuts a second insert supporting surface of a second type of cutting insert.

12 Claims, 8 Drawing Sheets

(56) References Cited

U.S. PATENT DOCUMENTS

| | | |
|---|---|---|
| 6,508,612 B1 | 1/2003 | Baca |
| 2005/0063792 A1 | 3/2005 | Satran |
| 2009/0047078 A1 | 2/2009 | Kirchberger |
| 2011/0150586 A1* | 6/2011 | Fang et al. ............ 407/69 |

* cited by examiner

CUTTING TOOL HOLDING A PLURALITY OF TYPES OF CUTTING INSERTS

RELATED APPLICATION DATA

This application is a §371 National Stage Application of PCT International Application No. PCT/EP2011/068854 filed Oct. 27, 2011claiming priority of European Patent Application Nos. 10189149.4 and 10189748.6, both filed Nov. 3, 2010.

BACKGROUND AND SUMMARY

The present invention relates generally to cutting tools.

U.S. Patent Application Publication U.S.2009/0047078, which is incorporated by reference, shows a cutting insert having a grooved surface defining plural support surfaces. The support surfaces are flat and meet at a sharp wedge base to form a wedge angle.

DE 103 08 037 A1, on which the preamble of claim 1 is based, U.S. Pat. Nos. 5,145,294 A 6,234,724 B1, 1,838,520 A and 6,152,658 A, all disclose tools that facilitate use of a plurality of different types of insert designs.

It is desirable to provide a cutting tool that facilitates use of a plurality of different types of insert designs. The term "toolholder" is defined for purposes of the present invention as broadly including toolholders with integral cutting insert pockets and toolholders in the form of cassettes that are adapted to be attached to a tool body, i.e., the cassette is a form of toolholder.

In accordance with an aspect of the present invention, a cutting tool comprises a a toolholder for holding a plurality of types of removable cutting inserts, the toolholder comprising a toolholder body comprising an insert-receiving recess, the recess comprising an insert abutment surface, for abutting a corresponding insert supporting surface of an insert, the insert abutment surface, comprising a first portion, adapted to abut a first insert supporting surface of a first type of cutting insert and a second portion, adapted to abut a second insert supporting surface of a second type of cutting insert. The second portion comprises two substantially triangular parts separated by the first portion, and disposed at non-zero angles relative to the first portion. Either one of the first type of cutting insert or the second type of cutting insert is mounted in the at least one insert-receiving recess, wherein the tool comprises at least one of the first type of cutting insert, abutting against the first portion, and/or at least one of the second type of cutting insert abutting against the second portion.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1A:
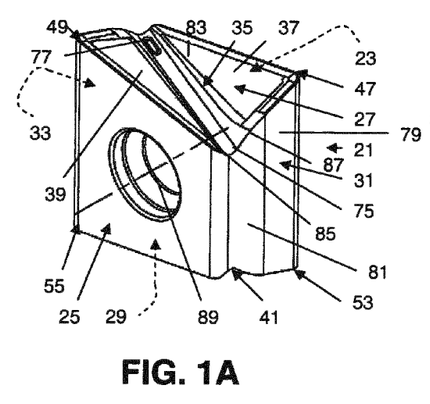
FIGS. 1A-1D are perspective, top, first side, and second side views of a cutting insert.
Figure 1B:
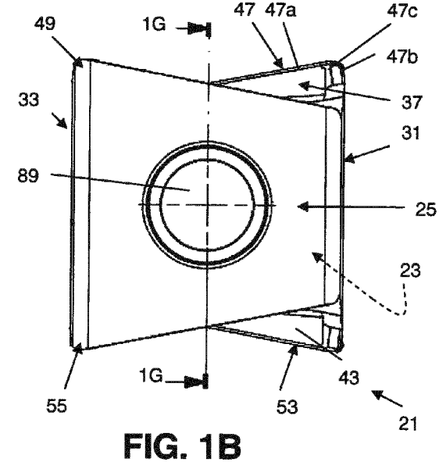
Figure 1C:
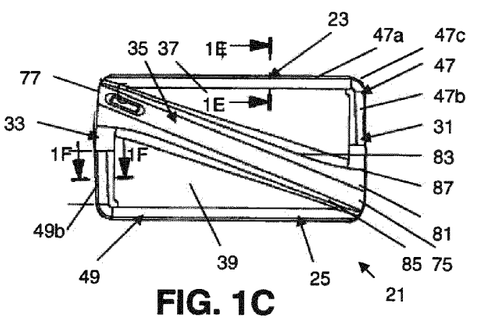
Figure 1D:
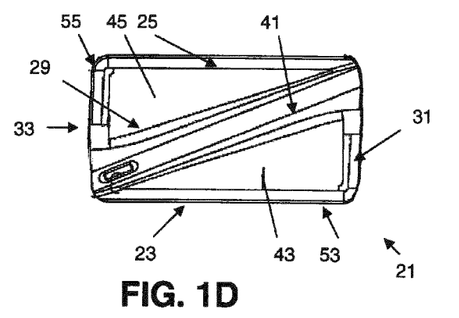
Figure 1E:
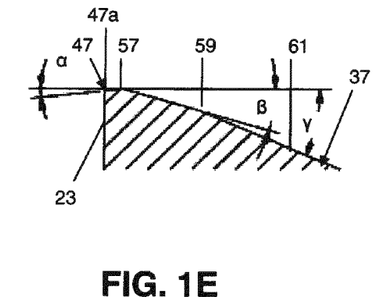
FIG. 1E is a cross-sectional view taken at section 1E-1E of FIG. 1C.
Figure 1F:
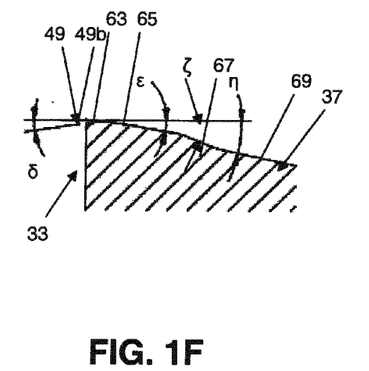
FIG. 1F is a cross-sectional view taken at section 1F-1F of FIG. 1C.
Figure 2:
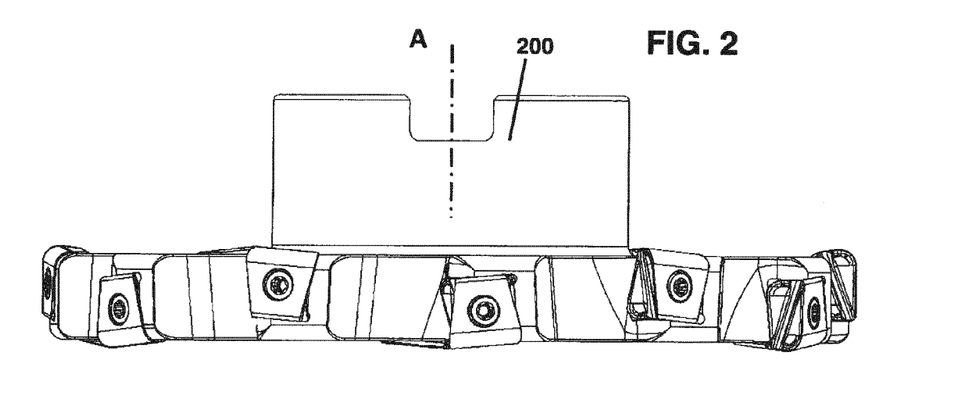
FIG. 2 is a perspective view of a cutting tool according to an aspect of the present invention.
Figure 3:
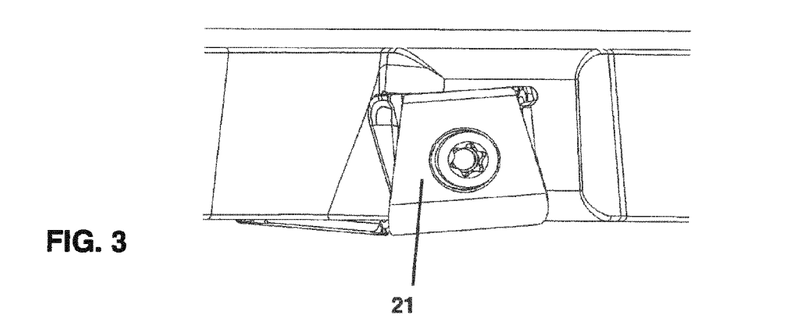
FIG. 3 is a perspective view of a portion of the cutting tool shown in FIG. 2.

FIGS. 1A-1F show an indexable cutting insert 21 or portions thereof that is considered to have particular application in connection with milling tools such as the disc milling tool 200 shown in FIGS. 2 and 3, but may be adapted for use with turning and other tools, as well.

FIG. 2 shows a disc milling tool 200 having inserts 21 that each have two "left-handed" cutting edges and two "right-handed" cutting edges. The inserts 21 are indexed so that, on a top side of the disc, what shall be referred to as their left-handed cutting edges are exposed to a workpiece (not shown) and so that, on a bottom side of the disc, what shall be referred to as their right-handed cutting edges are exposed to the workpiece.

Figure 4A:
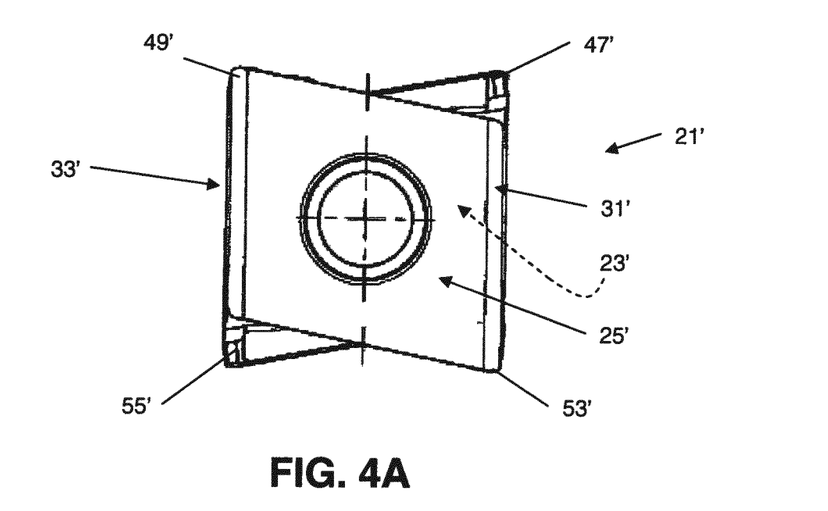
FIGS. 4A-4C are top, first side, and second side views of a cutting insert.
Figure 4B:
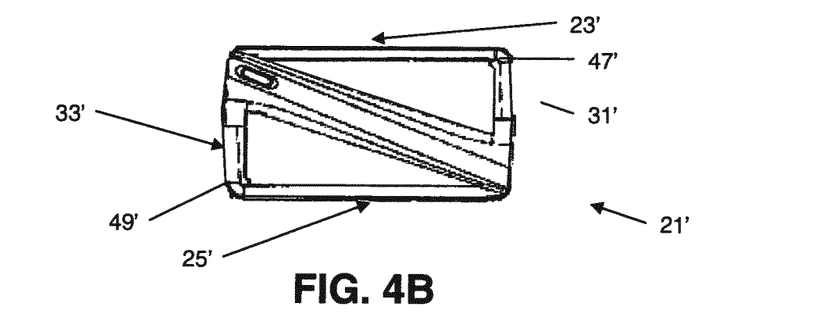
Figure 4C:
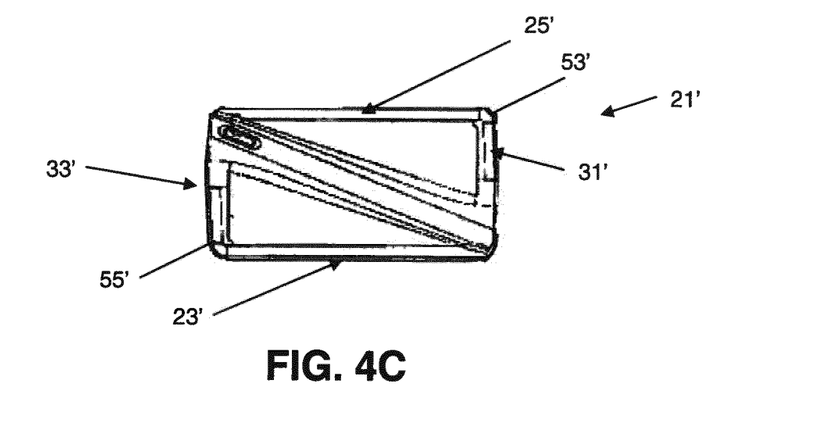

The inserts 21 are positioned on the tool so that, in the direction of rotation of the disc milling tool 200, they form a "positive" axial angle with an axis of rotation A of the disc milling tool, but they might instead be positioned so as to form a "negative" axial angle. Inserts used in a given toolholder may have cutting edges that all have the same "handedness", however, it will be appreciated that inserts with edges of different handedness, such as the insert 21, might be used in such a tool, instead. Likewise, inserts having all cutting edges of the same handedness might be positioned on a cutting tool so as to all form positive axial angles. An insert 21' having four cutting edges of the same handedness is shown in greater detail in FIGS. 4A-4C. The inserts 21 and 21' share many features and, accordingly, to simplify discussion, the insert 21 will be described, it being understood that the description generally applies as well to the insert 21', except where otherwise indicated.

The inserts 21 and 21' will ordinarily be made of a pressed and sintered cemented carbide, but may be made of other materials and by other processes, such as by grinding of a hard metal blank.

Referring to FIGS. 1A-1D, the insert 21 comprises a first mounting surface 23 and a second mounting surface 25 identical to the first mounting surface and on an opposite side of the insert from the first mounting surface. The insert 21 further comprises a first side surface 27 between the first mounting surface 23 and the second mounting surface 25 and a second side surface 29 between the first mounting surface and the second mounting surface and on an opposite side of the insert from the first side surface. The insert further comprises a first end surface 31 between the first mounting surface 23 and the second mounting surface 25 and between the first side surface 27 and the second side surface 29 and a second end surface 33 between the first mounting surface and the second mounting surface and between the first side surface and the second side surface and on an opposite side of the insert from the first end surface.

The insert 21 further comprises a first groove 35 extending substantially diagonally across the first side surface 27 and dividing the first side surface into discrete, separated first and second first side support surfaces 37 and 39, respectively. The insert 21 further comprises a second groove 41 extending substantially diagonally across the second side surface 29 and dividing the second side surface into discrete, separated first and second second side support surfaces 43 and 45, respectively.

In the insert 21 shown in FIGS. 1A-D the second side surface 29 (FIG. 1D) is a minor image of the first side surface 27 (FIG. 1C). As seen, for example, with respect to FIGS. 1A and 1B, the first mounting surface 23 (hidden in FIGS. 1A and 1B) and the identical second mounting surface 25 each have a substantially truncated triangle shape. By contrast, in the insert 21' shown in FIGS. 4A-4C, the second side surface 29' is identical to the first side surface 27', and the first mounting surface 23' and the second mounting surface 25' each have a substantially rhomboidal shape (which may include a square or rectangular shape).

The insert 21 can comprise four cutting edges 47, 49, 53, 55 corresponding to each of the support surfaces 37, 39, 43, and 45, respectively. The cutting edges 47 and 49 shall be denominated "left-handed" cutting edges and the cutting edges 53 and 55 shall be denominated "right-handed" cutting edges. In the insert 21' shown in FIGS. 4A-4C, the cutting edges 47', 49', 53', and 55' are all what is here denominated as left-handed, however, it will be appreciated that they might, instead, be all right-handed cutting edges (the diagonal grooves would extend from different corners). In the insert 21, the first cutting edge 47 is formed at an intersection of the first first side support surface 37, the first mounting surface 23, and the first end surface 31. The second cutting edge 49 is formed at an intersection of the second first side support surface 39, the second mounting surface 25, and the second end surface 33. The third cutting edge 53 is formed at an intersection of the first second side support surface 43, the first mounting surface 23, and the second end surface 33. The fourth cutting edge 55 is formed at an intersection of the second second side support surface 45, the second mounting surface 25, and the first end surface 31.

Referring to the first cutting edge 47 for purposes of illustration, and as seen, for example, in FIG. 1C, each cutting edge can comprise a first component 47a that extends along an adjacent one of the first and second mounting surfaces 23 and 25 (in the case of edge 47, along the first mounting surface 23) and a second component 47b that extends along an adjacent one of the first and second end surfaces 31 and 33 (in the case of edge 47, along the first end surface 31). The first and second cutting edge components 47a and 47b can be substantially straight and meet at a point or at a radiused corner 47c, or they can be curved and merge into each other. When the insert 21 is mounted in a cutting tool 200 in the manner shown in FIG. 2, the first component 47a is ordinarily referred to as an axial component and the second component 47b is ordinarily referred to as a radial component.

As seen in FIGS. 1E and 1F, the support surfaces can have specially designed geometries to facilitate formation of chips and removal of chips from a workpiece. FIG. 1E shows the first cutting edge component 47a as having, on the adjacent first first side support surface 37, an axial land 57 immediately inward of the cutting edge component. The illustrated axial land 57 forms an obtuse angle with the adjacent first mounting surface 23 (acute angle $\alpha$ with the perpendicular to the first mounting surface) which can strengthen the cutting edge component 47a, however, other configurations can be provided, including a land area that forms an acute angle with the first mounting surface, or is perpendicular to the first mounting surface, or is omitted entirely.

Inward from the axial land 57, the first first side support surface 37 comprises a axial first rake surface portion 59 that forms an angle with axial the land area and, in the illustrated embodiment, forms an acute angle $\beta$ with a line perpendicular to the first mounting surface 23 and an acute angle with the first mounting surface itself, which configuration can facilitate cutting of the workpiece, however, other configurations can be provided, including an axial first rake surface portion that forms an obtuse angle with the first mounting surface or is perpendicular to the first mounting surface. In the illustrated embodiment, inward from the axial first rake surface portion 59, an axial second rake surface portion 61 is provided that forms an acute angle $\gamma$ with the perpendicular to the mounting surface 23 which, in the illustrated embodiment, is a larger acute angle than the angle $\beta$, and an acute angle with the first mounting surface itself. It will be appreciated that the axial land 57 and axial rake surface portions 59 and 61 can have configurations other than those illustrated.

FIG. 1F shows a second cutting edge component 49b (identical to the first cutting edge component 47b) as having, on the adjacent second first side support surface 39, a radial land 63 immediately inward of the cutting edge component. The illustrated radial land 63 forms an obtuse angle with the adjacent second end surface 33 (acute angle $\delta$ with perpendicular to second end surface) which can strengthen the cutting edge component 49b, however, other configurations can be provided, including a land area that forms an acute angle with the first mounting surface, or is perpendicular to the first mounting surface, or is omitted entirely.

Inward from the radial land 63, the second first side support surface 39 comprises a radial first rake surface portion 65 that forms an angle $\epsilon$ with a perpendicular to the first end surface 33 which, in the illustrated embodiment, is an acute angle and can facilitate cutting of the workpiece, and an acute angle with the first end surface itself, however, other configurations can be provided, including a radial first rake surface portion that forms an obtuse angle with the first end surface or is perpendicular to the first end surface. In the illustrated embodiment, inward from the radial first rake surface portion 65, a radial second rake surface portion 67 is provided that forms an angle with the radial first rake surface portion and forms, in the illustrated embodiment, a larger acute angle $\zeta$ with the perpendicular to the first end surface 33 than the radial first rake surface portion (and a smaller acute angle with the first end surface itself). In the illustrated embodiment, inward from the radial second rake surface portion 67, a radial third rake surface portion 69 is provided that forms an angle with the radial second rake surface portion and forms, in the illustrated embodiment, a smaller acute angle $\eta$ with the perpendicular to the first end surface 33 than the radial second rake surface portion. The radial third rake surface portion 69 forms an acute angle with the first end surface 33. It will be appreciated that the radial land 63 and the radial rake surfaces 65, 67, and 69 can have configurations other than those illustrated.

Inward of any geometry provided by the cutting edges and the rake surface portions, if provided, the support surfaces will ordinarily be substantially flat until they intersect with the grooves in the first and second side surfaces. In a presently preferred embodiment of the insert, the grooves 35 and 41 divide the side surfaces 27 and 29 into discrete, separated, triangular first and second first side support surfaces 37 and 39, and 43 and 45. With respect, for example, to the first side surface, the first and second first side support surfaces 37 and 39 are each bounded along first and second edges thereof by rake surfaces 59 and 65 forming non-zero angles with the first and second side support surfaces and along third edges thereof by the groove (35). A plane of, for example, the first first side support surface 37 forms an angle of between 60 and 85 degrees, more preferably about 79 degrees, with a plane of the first end surface 31 and an angle of between 45 and 85 degrees, more preferably 77 degrees, with a plane of the first mounting surface 23.

Figure 1G:
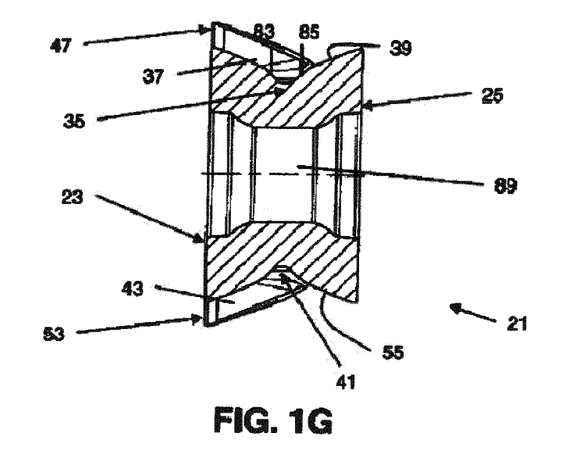
FIG. 1G is a cross-sectional view taken at section 1G-1G of FIG. 1B.
Figure 5A:
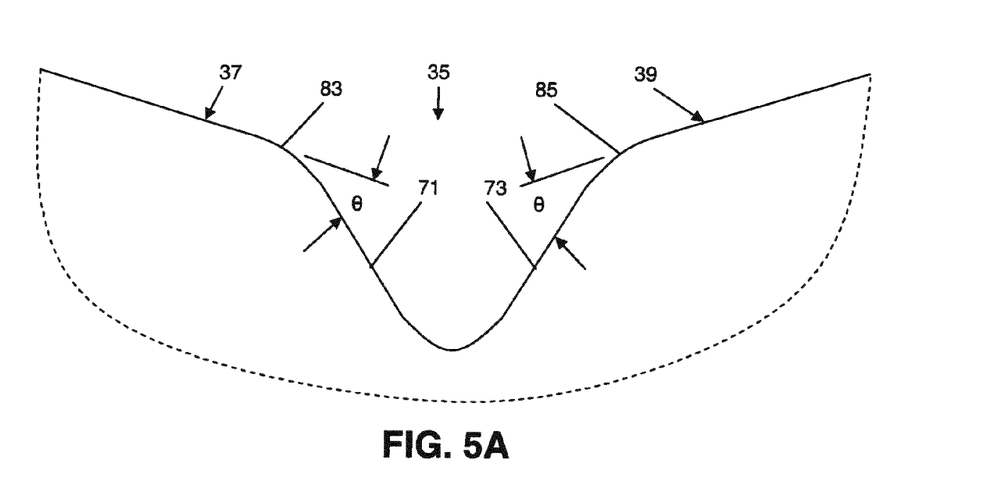
FIGS. 5A and 5B are schematic views showing portions of a side face of an insert with a U-shaped groove and a V-shaped groove, respectively.
Figure 5B:
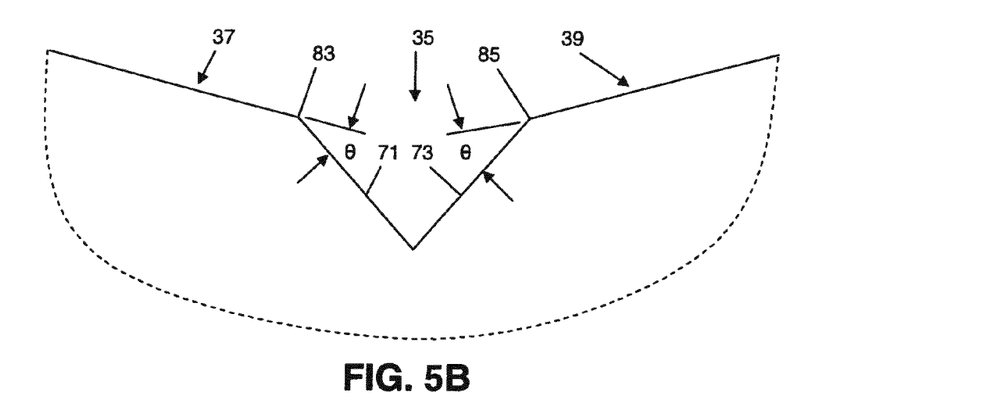

As seen, for example, with respect to FIG. 1G, the first and second grooves 35 and 41 are ordinarily one of substantially U-shaped and substantially V-shaped. Discussing for purposes of illustration, the first groove 35 (it being appreciated that the second groove is identical or a mirror image of the first groove), as seen in FIG. 5A (U-shaped groove) and 5B (V-shaped groove), the first groove has first and second groove side surfaces 71 and 73 forming non-zero angles θ with adjacent portions of the first and second first side support surfaces 37 and 39, respectively. Forming the groove side surfaces 71 and 73 so that the grooves are depressed relative to the side support surfaces can facilitate flow and removal of chips cut from a workpiece. In the illustrated examples, the first and second groove side surfaces 71 and 73 are substantially flat, however, they may be curved. The first and second groove side surfaces 71 and 73 may merge gradually into the first and second first side support surfaces 37 and 39 as shown in FIG. 5A, or they may intersect with the first and second first side support surfaces along a line or sharp curve as shown in FIG. 5B. The first and second groove side surfaces 71 and 73 may meet at a curved bottom as shown in FIGS. 1G and 5A, a flat bottom (not shown), or as shown in FIG. 5B, at a line or sharp curve.

Again discussing the first groove 35 for purposes of illustration, as seen in FIG. 1A an 1C, opposite ends 75 and 77 of each groove intersect with the first end surface 31 and the second end surface 33, respectively. The ends 75 and 77 of the grooves can flare outwardly to larger widths which can, among other things, facilitate removal of chips cut from a workpiece.

The first end surface 31 and the second end surface 33 ordinarily each comprise at least one clearance surface portion adjacent a corresponding cutting edge and at least one insert supporting surface portion remote from the corresponding cutting edge. As seen, for example, in FIG. 1A, discussing the first end surface 31 and the first cutting edge 47 for purposes of illustration, the first end surface comprises a clearance surface 79 adjacent the first cutting edge, which is referred to here as its corresponding cutting edge. When the milling tool 200 shown in FIG. 2 turns about its axis of rotation in a cutting direction, the clearance surface follows the cutting edge. As seen in FIG. 1A, the first end surface 31 further comprises a supporting surface portion 81 that abuts an abutment surface (not shown) in a recess on the milling tool when the second cutting edge 49 is in use. The supporting surface portion 81 can also be remote from what shall be referred to here as its corresponding cutting edge 47. In this way, the supporting surface portion on any end surface that is functioning to support the insert is remote from the nearest (non-working) cutting edge, which reduces the risk of damage to that cutting edge.

Each of the first groove 35 and the second groove 41 has two longitudinal edges that intersect each of the first end surface and the second end surface. Again, discussing the first groove 35 for purposes of illustration, as seen in FIG. 1A, the first groove includes two longitudinal edges 83 and 85 that intersect, for example, the first end surface 31. The at least one insert supporting surface portion 81 on the first end surface 31 is disposed even with or below a point 87 at which one of the longitudinal edges 83 of the groove 35 closest to the cutting edge 47 corresponding to that at least one insert supporting surface 81 intersects the first end surface.

A through hole 89 ordinarily extends between the first mounting surface 23 and the second mounting surface 25. As seen in FIGS. 2 and 3, a clamping screw 91 extends through the through hole and threads on the clamping screw mate with threads (not shown) on the milling tool toolholder body. An enlarged head of the screw 91 abuts a clamping surface in the through hole to clamp the insert relative to the toolholder body.

Figures 6A, 6B, 7B:
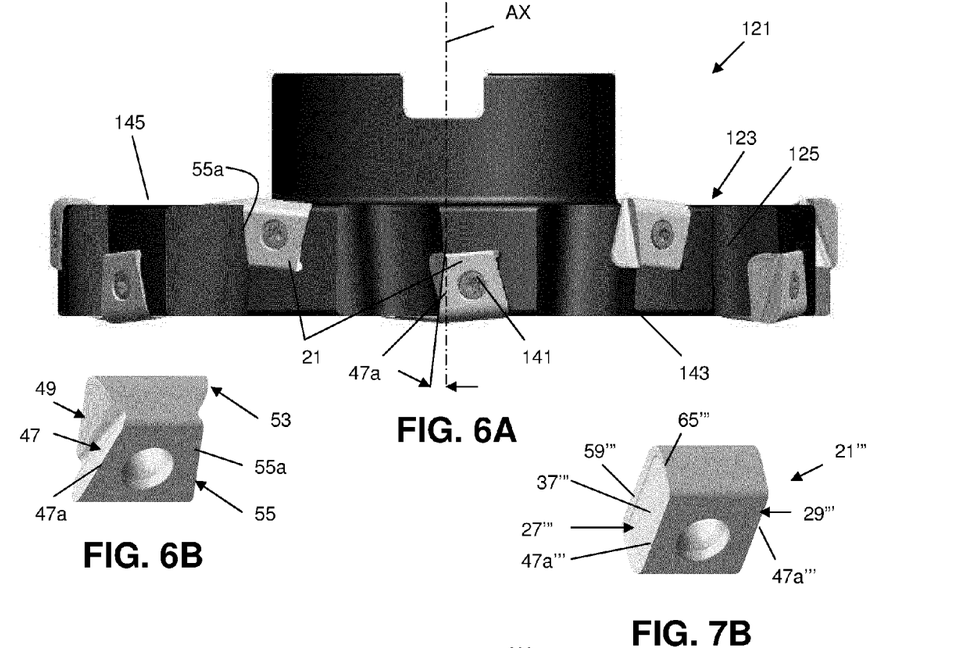
FIG. 6A is a side view of a cutting tool according to an aspect of the present invention.
FIG. 6B is a perspective view of a cutting insert used in the cutting tool of FIG. 6A.
FIG. 7B is a perspective view of a cutting insert used in the cutting tool of FIG. 7A.
Figure 7A:
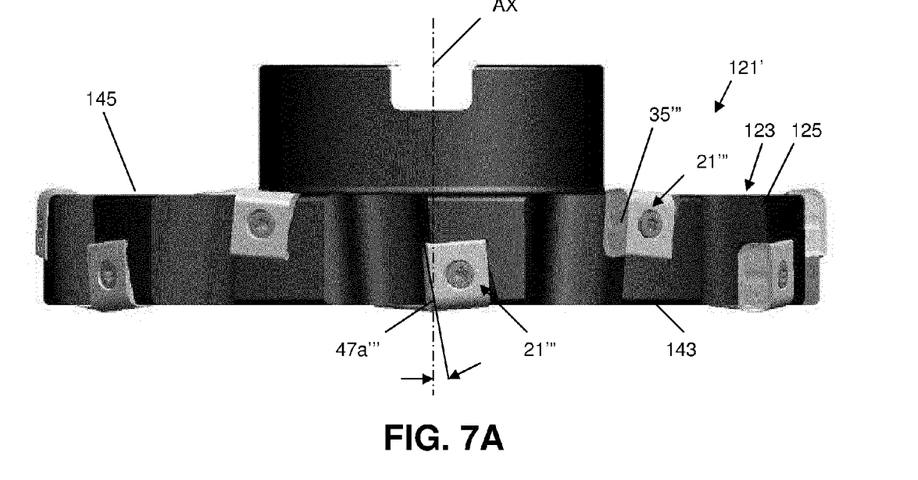
FIG. 7A is a side view of a cutting tool according to another aspect of the present invention.

Cutting tools 121 and 121' according to further aspects of the present invention are shown in FIGS. 6A and 7A. Each cutting tool 121 and 121' uses the same toolholder 123, but the first cutting tool 121 uses a first type of cutting insert 21 and/or 21' as described in connection with FIGS. 1A-5B, while the second cutting tool 121' uses a second type of cutting insert 21'''. A third cutting tool (not shown) can use both the first types of cutting inserts 21 and/or 21' and the second types of cutting inserts 21''' at the same time. For purposes of discussion, this aspect of the invention will describe the first cutting tool 121 in connection with only the insert 21 as the first type of cutting insert, however, it will be appreciated that the insert 21' could be used instead of the insert 21, except where otherwise indicated. The cutting tools 121 and 121' are rotating tools and, more specifically, disc milling tools, however, it will be appreciated that aspects of the invention are not necessarily limited to rotating tools.

The first and second types of inserts 21 and 21''' are shown in greater detail in FIGS. 6B and 7B and are merely illustrative of types of inserts usable in connection with the present invention. As described in connection with FIGS. 1A-1G, the insert 21 comprises a first side surface 27 and a second side surface that each have a diagonal groove 35 and 41, respectively. The groove 35 divide the first side surface 27 into first and second substantially triangular first side support surfaces 37 and 39 that form non-zero angles with each other, and the groove 41 divides the second side surface 29 into first and second substantially triangular second side support surfaces 43 and 45 that form non-zero angles with each other. Rake surfaces 59 and 65 are disposed between the side support surfaces and cutting edges.

The second type of insert 21''' has first and second side surfaces 27''' and 29''', each identical with substantially planar support surfaces 37''' and rake faces 59''' and 65''' between the support surfaces and the cutting edges. The first and second side surfaces 27''' and 29''' can each be provided with ridges or grooves 35''' (FIG. 7A) that are not necessarily diagonal and that may engage with corresponding grooves or ridges (not shown) in recesses on the toolholder to provide additional stability to the insert. As seen in FIG. 7B, however, the groove or ridge need not be provided.

As seen in FIGS. 8-12, the toolholder 123 comprises a toolholder body 125 comprising an insert-receiving recess 127 and/or 127'. Referring to the recess 127 for purposes of discussion, the recess has an insert abutment surface 129 for abutting a corresponding insert supporting surface 37, 39 or 43, 45 of the insert 21 or insert supporting surface 37''' of the second type of insert 21'''. For toolholders 123 intended for use with the insert types 21 and 21''', the insert abutment surface 129 is substantially rectangular when viewed in plan, however, for inserts of different shapes, the insert abutment surface may have other shapes when viewed in plan. The insert abutment surface 129 comprises a first portion 131 adapted to abut the insert supporting surface 37''' of the second insert type 21''' and a second portion 133 for abutting a corresponding insert supporting surfaces 37, 39 or 43, 45 of the insert 21.

The second portion 133 comprises two parts 133a and 133b separated by the first portion 131. The two parts 133a and 133b of the second portion 133 can be in the form of two substantially triangular parts disposed at non-zero angles relative to the first portion 131. The triangular parts 133a and 133b can form substantially the same angle with each other that the triangular first side support surfaces 37 and 39 or 43 and 45 form with each other. The two parts 133a and 133b will ordinarily contact the insert supporting surfaces 37, 39 or 43, 45 of the first type of insert 21 inward of the rake faces 59 and 65.

The first portion 131 can extend substantially diagonally relative to the rectangular shape of the insert abutment surface 129. The first portion 131 will ordinarily be substantially planar to abut a substantially planar insert supporting surface 37''' of the second type of insert 21''', although, if the insert supporting surfaces 37''' are non-planar, the first portion 131 can also be non-planar, such as by having a shape corresponding to the shape of the insert supporting surfaces. If ridges or grooves are provided on the insert supporting surfaces 37''', for example, grooves and ridges can be provided on the first portion 131 to mate with the ridges or grooves. The first portion 131 will ordinarily contact the insert supporting surfaces 37''' inward of the rake faces 59''' and 65'''.

The recess 127 further comprises a second and a third insert abutment surface 135 and 137. Ordinarily, when the first type of insert 21 (or the second type of insert 21''') is mounted in the recess 127, either the first or the second side mounting surface 23 or 25 will contact the second abutment surface 135 and insert supporting surfaces on either the first end surface 31 or the second end surface 33 will contact the third abutment surface. Ordinarily, one of the second and the third insert abutment surfaces 135 or 137 comprises a threaded hole 139 for receiving a clamping screw 141 (FIGS. 6A and 7A) that extends through a hole in the insert. In the embodiments of the cutting tool 121 and 121' shown in FIGS. 6A and 7A, the threaded hole 139 is provided in the second abutment surface 135 and extends substantially radially relative to an axis AX of rotation of the cutting tool. In other tools, however, the threaded hole may extend non-radially, such as into the third abutment surface 137.

Figure 8:
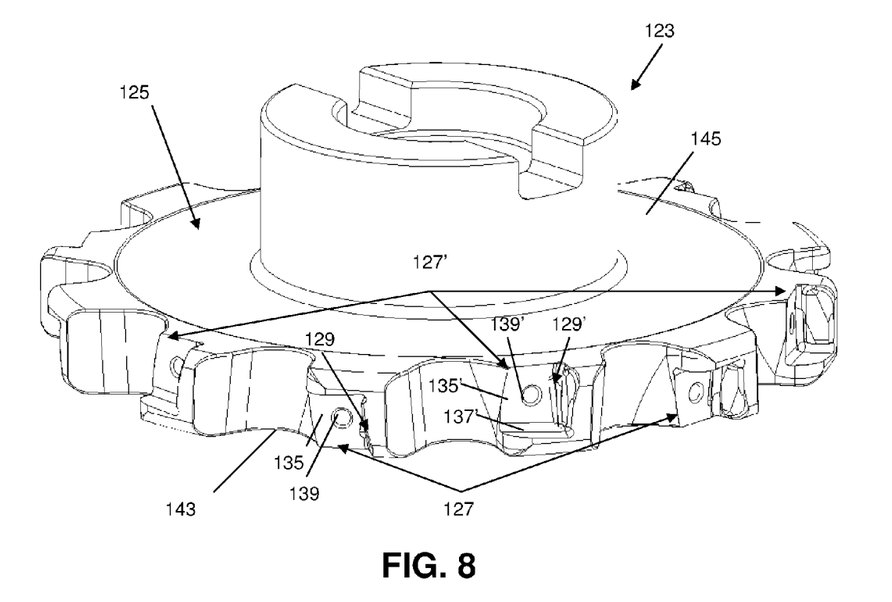
FIG. 8 is a perspective view of a toolholder.
Figure 9:
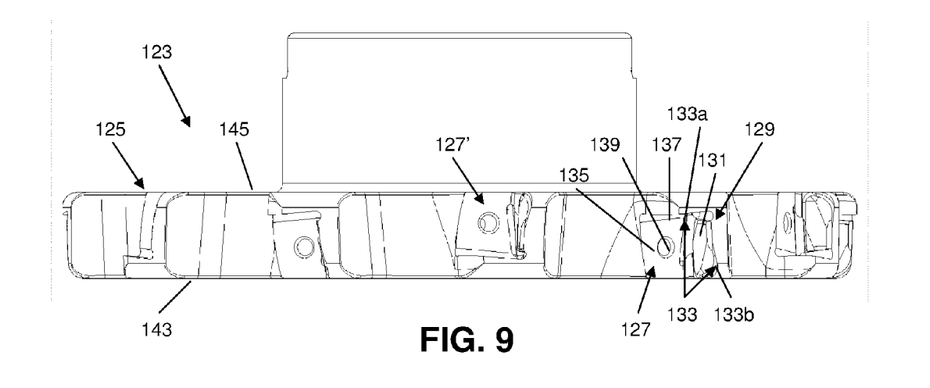
FIG. 9 is a side view of a toolholder.
Figure 10:
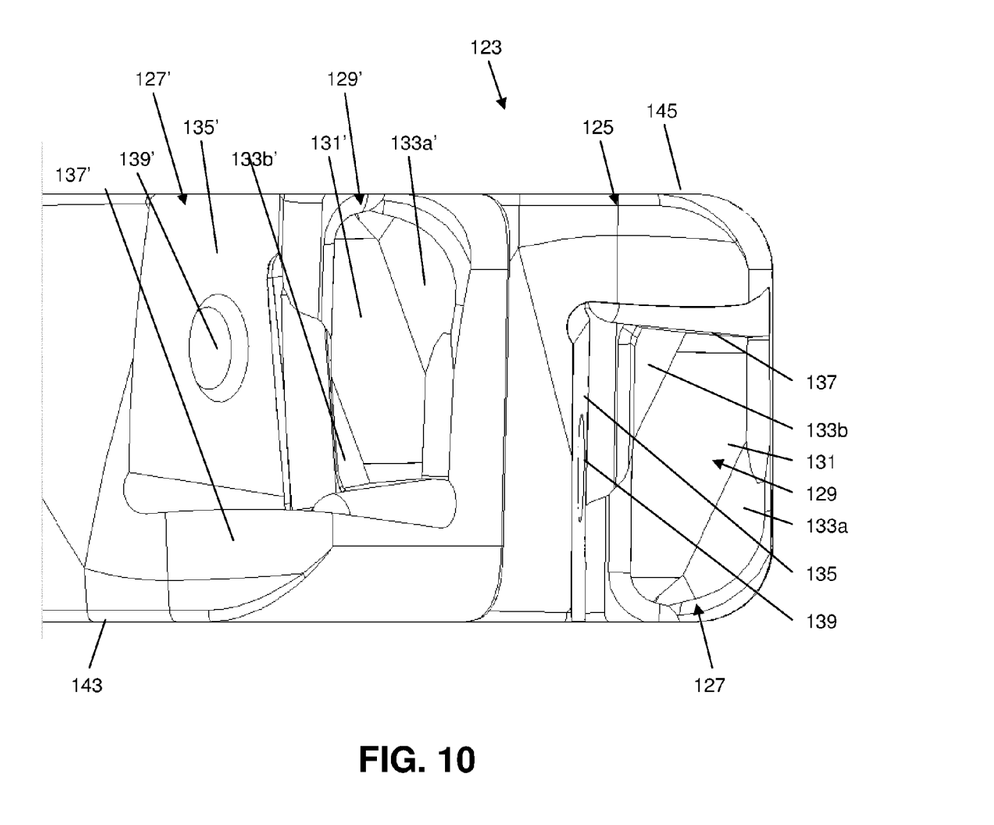
FIG. 10 is a side view of a portion of a toolholder.
Figure 11:
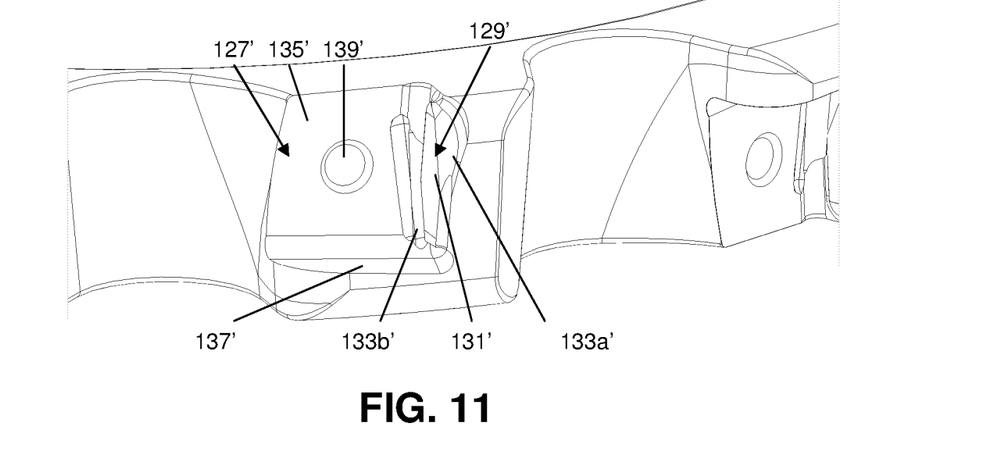
FIG. 11 is a perspective view of a portion of a toolholder.
Figure 12:
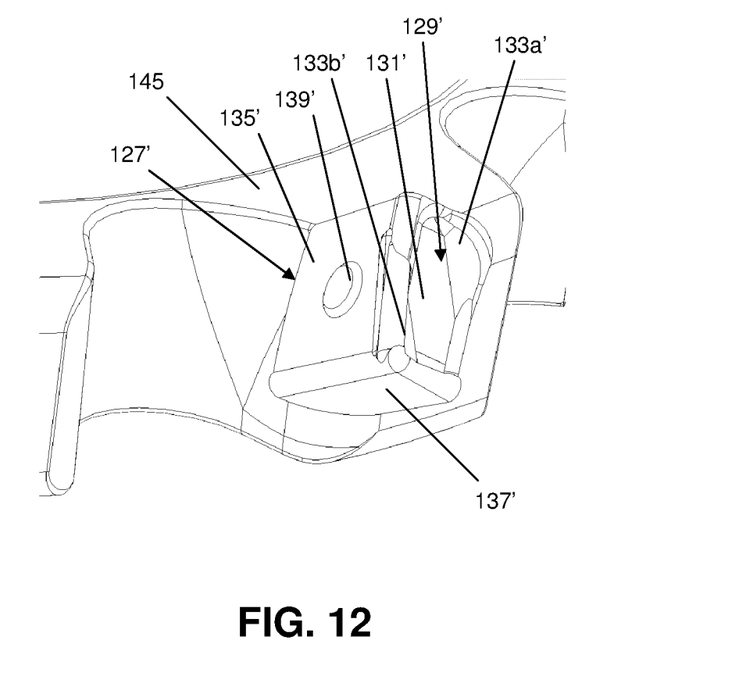
FIG. 12 is a perspective view of a portion of a toolholder taken from a different viewing angle than the view of FIG. 11.

As seen, for example, in FIGS. 8-10, the toolholder body 125 may have an insert-receiving recess 127 extending to a first side 143 of the toolholder body and/or an insert-receiving recess 127' extending to a second side 145 of the toolholder body and/or an insert-receiving recess (not shown) that does not extend to either the first or second side of the toolholder body. The insert-receiving recess 127 is a substantial mirror image of the insert-receiving recess 127'. When the insert 21 is mounted in the recess 127, the cutting edges 47 or 49 are in use and the first and second side supporting surfaces 43 and 45 contact the parts 133a and 133b. When the insert 21 is mounted in the recess 127, the cutting edges 53 or 55 are in use and the first and second side supporting surfaces 37 and 39 contact parts 133a' and 133b'. The insert 21' is only adapted to be mounted in the recess 127, although the insert 21' could be used on both sides of a cutting tool by replacing the recesses 127' with recesses 127. The inserts 21''' are usable in any of the recesses 127 or 127'. As seen, for example, in FIGS. 11 and 12, the recesses 127' can have insert abutment surfaces 129' with first portions 131' and second portions 133' with first and second parts 133a' and 133b', second abutment surfaces 135', and third abutment surfaces 137', and threaded holes 139'

The particular cutting tools 121 and 121' shown in FIGS. 6A and 7A are rotating tools and the insert-receiving recesses 127 in the toolholder body 125 are designed for use with particular insert types 21, 21', or 21'''. When, as seen in FIG. 6A, the first type of cutting insert 21 is mounted in the insert-receiving recesses 127, the first cutting edge component 47a forms what is denominated as a positive angle with an axis of rotation of the cutting tool and, when, as seen in FIG. 7A, the second type of cutting insert 21''' is mounted in the insert-receiving recesses, the first cutting edge component 47a''' on that insert forms a negative angle with the axis of rotation of the cutting tool. The toolholder 125 and the first and second insert types 21 and 21''' can be designed so that, regardless which type of insert 21 or 21''' is mounted in the recesses 127 of the toolholder, the diameter of the cutting tool 121 or 121' is the same in the sense that a circle defined by the rotating cutting tool will have the same diameter.

Each of the first type of cutting insert 21 and the second type of cutting insert 21''' can be an indexable insert indexable to at least two different positions in the insert-receiving recess 127, such as by being flipped over. The insert 21 can be indexed to two different positions on the toolholder 123 to use either the cutting edge 47 or 49 when mounted in a recess along the first side 143 of the toolholder body 125 by being flipped over. If insert-receiving recesses 127' are provided along the second side 145 of the toolholder body 125 that are a mirror image of the recess 127, the insert 21 can be indexed to two other positions to use the other two cutting edges 53 and 55. The insert 21' (FIGS. 4A-4C) can be indexable to four different positions in the recess 127 by being flipped over or by being turned 180° around the longitudinal axis but cannot be used in the recess 127'. The second type of cutting insert 21''' may be indexable to at least four different positions in either insert-receiving recess 127 or 127' by being flipped over or by being turned 180° around the longitudinal axis.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

The disclosures in EP Patent Application Nos. 10189748.6 and 10189749.4, from which this application claims priority, are incorporated herein by reference.

What is claimed is:

1. A cutting tool, comprising:
a toolholder for holding a plurality of types of removable cutting inserts, the toolholder including a toolholder body having an insert-receiving recess, the recess including an insert abutment surface for abutting a corresponding insert supporting surface of an insert, the insert abutment surface having a first portion that abuts a first insert supporting surface of a first type of cutting insert and a second portion that abuts a second insert supporting surface of a second type of cutting insert, wherein the second portion includes two substantially triangular parts separated by the first portion and disposed at non-zero angles relative to the first portion, and wherein either one of the first type of cutting insert or the second type of cutting insert is mounted in the at least one insert-receiving recess; and at least one of the first type of cutting insert abutting against the first portion and/or at least one of the second type of cutting insert abutting against the second portion.

2. The cutting tool as set forth in claim 1, wherein the cutting tool is a rotating tool, the first type of cutting insert has a first cutting edge, and the second type of cutting insert has a second cutting edge, and wherein when the second type of cutting insert is mounted in the at least one insert-receiving recess, the second cutting edge forms a negative angle with an axis of rotation of the cutting tool and, wherein when the first type of cutting insert is mounted in the at least one insert-receiving recess, the first cutting edge forms a positive angle with the axis of rotation of the cutting tool.

3. The cutting tool as set forth in claim 1, wherein a diameter of the cutting tool is the same regardless whether the first type of cutting insert is mounted in the at least one insert-receiving recess or the second type of cutting insert is mounted in the at least one insert-receiving recess.

4. The cutting tool as set forth in claim 1, wherein each of the first type of cutting insert and the second type of cutting insert is an indexable insert indexable to at least two different positions in the insert-receiving recess.

5. The cutting tool as set forth in claim 1, wherein at least one of the first type of cutting insert and the second type of cutting insert is indexable to at least four different positions in the insert-receiving recess.

6. The cutting tool as set forth in claim 1, wherein the cutting tool is a rotating tool, and wherein each of the first type of cutting insert and the second type of cutting insert includes a through hole, the cutting tool further comprising a clamping screw that extends through the through hole in either one of the first type of cutting insert and the second type of cutting insert in the insert-receiving recess and into a threaded opening in the toolholder body, and wherein the threaded opening extends substantially radially relative to an axis of rotation of the cutting tool.

7. The cutting tool as set forth in claim 1, wherein the cutting tool is a rotating tool and the toolholder body has first and second sides extending generally transversely relative to an axis of rotation of the cutting tool, and at least one insert-receiving recess extends to a respective one of the first and second sides.

8. The cutting tool as set forth in claim 1, wherein the insert abutment surface is substantially rectangular when viewed in plan, and the first portion extends substantially diagonally relative to the rectangle.

9. The cutting tool as set forth in claim 1, wherein the recess includes a second abutment surface and a third insert abutment surface.

10. The cutting tool as set forth in claim 9, wherein one of the second abutment surface and the third insert abutment surface includes a threaded hole for receiving a clamping screw (141).

11. The cutting tool as set forth in claim 1, wherein the toolholder body has at least one insert-receiving recess extending to a first side of the toolholder body.

12. The cutting tool as set forth in claim 11, wherein the toolholder body has at least one insert-receiving recess extending to a second side of the tool holder body.

* * * * *